No. 608,859. Patented Aug. 9, 1898.
A. A. HOLT.
VEHICLE RUNNING GEAR.
(Application filed Jan. 17, 1898.)
(No Model.)
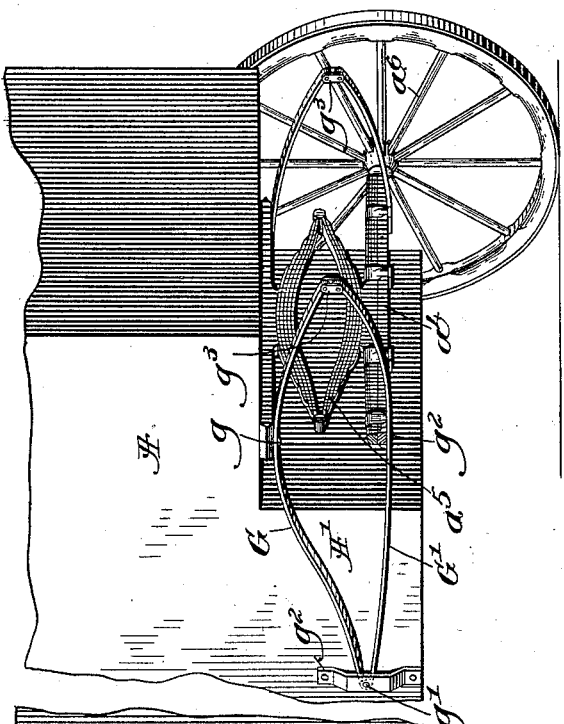
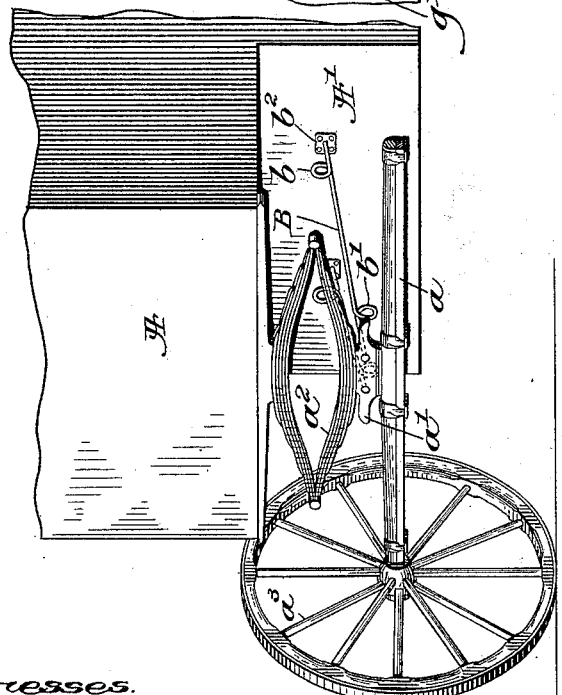
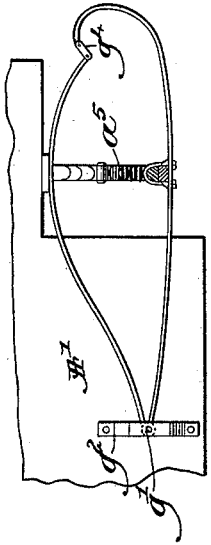
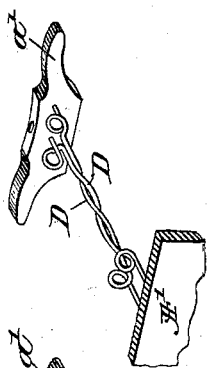
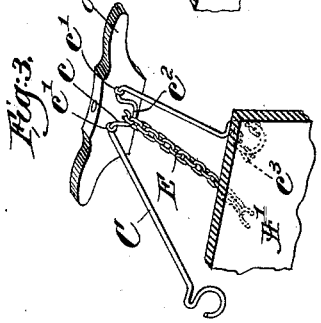
Witnesses.
Edward F. Allen.
Walter G. Lombard
Inventor:
Albert A. Holt.
by Crosby Gregory.
Attys.
THE NORRIS PETERS CO., PHOTO-LITHO., WASHINGTON, D. C.

UNITED STATES PATENT OFFICE.

ALBERT A. HOLT, OF FITCHBURG, MASSACHUSETTS.

VEHICLE RUNNING-GEAR.

SPECIFICATION forming part of Letters Patent No. 608,859, dated August 9, 1898.

Application filed January 17, 1898. Serial No. 666,919. (No model.)

*To all whom it may concern:*

Be it known that I, ALBERT A. HOLT, of Fitchburg, county of Worcester, State of Massachusetts, have invented an Improvement in Vehicle Running-Gears, of which the following description, in connection with the accompanying drawings, is a specification, like letters on the drawings representing like parts.

My invention is an improvement in that class of vehicles known as "low-down wagons," and has for its object the provision of simple, neat-appearing, and durable mechanism in connection with the usual running-gear for permitting the latter to yield under all the circumstances usually experienced, but without causing corresponding motion of the body of the vehicle. These vehicles are commonly used for the conveyance of milk and other dairy products, and it is extremely desirable that there shall be as little agitation as possible of the vehicle-body, and consequently of the load carried thereby. Accordingly I have herein provided between the low-down portion of the body or vehicle and the forward axle or head-block a spring connection without joints and which has considerable rigidity, but is yet yielding enough to permit the front wheels, either or both of them, to yield suddenly without disturbing the vehicle-body in passing a stone or obstruction, and at the rear of the vehicle, between the low-down portion of the body and the rear running-gear, I have provided special draft-springs.

The details of my invention will be pointed out more fully in the course of the following description, reference being had to the accompanying drawings, illustrating embodiments thereof, and the invention will be defined in the appended claims.

In the drawings, Figure 1 is a fragmentary view in perspective of the forward portion of the vehicle, showing the yielding spring connection between the head-block and the drop portion of the vehicle-body. Fig. 2 is a similar view of the rear part of the vehicle, showing one form of draft-spring. Figs. 3 and 4 are fragmentary details in perspective of modified forms of the forward connections, and Fig. 5 is a detail in side elevation of a modified form of draft-spring.

The vehicle-body A, having a low-down portion A', the front running-gear comprising an axle $a$, head-block $a'$, supporting-spring $a^2$, and wheel $a^3$, and the rear running-gear comprising an axle $a^4$, supporting-spring $a^5$ and wheel $a^6$, may be and are of any usual construction, preferably such as is shown in my Patent No. 589,127, dated August 31, 1897. Between the portion A' of the body and the forward running-gear I secure a yielding but unjointed spring B, said spring being herein shown in the form of a stiff spring-rod, preferably having a coil at one or both ends, being shown as upwardly coiled at $b$ near its rear end and downwardly coiled at $b'$ and having its rear end held in the drop-body by some suitable means, a plate $b^2$ being herein shown for the purpose, and having its forward end secured to the running-gear, being herein shown as permanently secured in the head-block $a'$. Preferably there will be two of these springs B, slightly divergent toward their rear ends, as shown in Fig. 1.

It will be understood that the forward running-gear may be of any kind and that in the kind of running-gear herein shown it is desirable that the springs B should be secured in the head-block; but, as explained in my before-mentioned patent, the relations between the drop-body and the running-gear will be varied according to the different kinds of the latter.

Instead of having the springs B entirely independent I have shown in Fig. 3 a double spring C, having its U-shaped end $c$ secured in eyes $c'$ to the head-block $a'$ and deflected at $c^2$ to bear firmly on the head-block, the rear ends of the spring being held by staples $c^3$ and secured against or in the drop-body A'.

In Fig. 4 I have shown two spring-wires D substantially similar to the wires B, said wires being twisted together in order to give thereby substantially the same lateral resistance which is secured by the divergent arrangement shown in Figs. 1 and 3. Preferably in connection with these springs a safety chain, rope, or strap E will be employed, as shown in Fig. 3. The operation of these spring-rods is substantially similar in general to that fully explained in my patent mentioned above, and in addition thereto there is an extreme facility of universal movement in every direction required and to every possible situation and emergency.

The springs B C D, respectively, are strong and comparatively rigid, and yet by reason of their length and of the coils when the latter are employed they have a capability of yielding sufficient for all requirements.

At the rear of the vehicle I employ at each side thereof a draft-spring, which in practice I have found to be of extreme service and peculiar advantage to this class of vehicles, this spring having a general resemblance to an elliptical spring, but being very different therefrom in its purposes and action.

Referring to Fig. 2 it will be seen that a leaf or other form of spring member G is connected intermediately at $g$ to the upper support of the spring $a^5$ and is thence deflected downwardly and secured at its forward end to the body A' at $g'$, a bracket $g^2$ being herein shown for properly retaining it. A second spring member G' extends from the point $g'$ back to the axle $a^4$, where it is secured at $g^2$, and, as herein shown, the spring members G G' extend rearwardly and are connected by a link $g^3$, pivoted at each end to said respective spring members. The point $g'$ is below the median horizontal line between the top and bottom points of union at $g$ $g^2$, whereby a freedom of movement is secured, as will be evident when it is considered that whenever one or both of the hind wheels of the wagon ride over an obstruction, thereby suddenly raising the axle, the latter is free to raise the spring G' without any appreciable resistance therefrom, for the reason that said spring is on an approximately horizontal line, so that its movement would be simply from a position slightly below the horizontal line to a position slightly above the horizontal line. In Fig. 5 I have shown the same general construction, the spring members of the draft-spring, however, being connected by a link $g^4$, arranged at a different angle from the corresponding link $g^3$, (shown in Fig. 2,) the position of the link $g^4$ being preferable under certain circumstances where a more or less yielding action is required.

It will be understood that the members G G' together constitute the draft-spring and that, as shown, they are not the supporting-springs of the vehicle, the spring $a^5$ being herein shown as said supporting-spring, although I do not restrict myself exactly to the showing. One main advantage of these draft-springs as constructed is to absolutely prevent any tipping of the rear axle, which frequently occurs in suddenly starting this class of wagons, my construction maintaining the axle in proper position relatively to the vehicle-body and also preventing it turning or rocking, while at the same time not interfering in the slightest with the proper easy up-and-down movement of the axle relatively to the vehicle-body.

The general operation of my invention will be readily understood by those skilled in the art. As the vehicle is being driven along the street, for instance, any of the wheels may be suddenly raised or lowered by riding over a curbstone or into a rut, and yet, notwithstanding this disturbance of the running-gear, the vehicle-body will be undisturbed, remaining substantially quiescent, and yet the springs B, C, or D, as the case may be, and the draft-springs at the rear of the vehicle cause a steadiness and certainty of forward movement which is requisite in this class of vehicles and cause this movement without any jerking or unevenness. In other words, the general effect of my invention is to give absolute smoothness to all the varying motions which are met with.

Various modifications and substitutions may be resorted to without departing from the spirit and scope of my invention.

Having fully described my invention, what I claim, and desire to secure by Letters Patent, is—

1. A vehicle of the class described, comprising a low-down body and front and rear running-gear, each provided with supporting-springs for carrying the load; said front running-gear having separated spring-rods extending continuously therefrom to the low-down portion of the vehicle-body and secured at their rear ends to the vehicle-body, and at their forward ends to the head-block of the running-gear; and said rear running-gear being provided with an elliptical draft-spring having its top and bottom members connected respectively to the rear end of the vehicle-body and to the axle, and having its forward end connected to the low-down portion of the vehicle-body, the bottom member of said draft-spring being in substantially a horizontal line extending from said axle to its said point of connection with the vehicle-body, substantially as described.

2. In a vehicle of the class described, the combination with the low-down body and the front running-gear, of a continuous spring extending between said running-gear and body, said spring having free resilient movement in all directions, substantially as described.

3. In a vehicle of the class described, the combination with the low-down body and the front running-gear, of a continuous spring extending between said running-gear and body, said spring having an upturned coil adjacent its rear end, and a downturned coil adjacent its forward end, substantially as described.

4. The combination with a low-down body and the front running-gear, of two spring rods or members capable of universal yielding movement and extending divergently from the head-block of the running-gear to the low-down portion of the vehicle-body and secured thereto, substantially as described.

5. The combination with a low-down body and the rear running-gear, of a draft device including divergent spring members and secured together at their forward ends to the low-down portion of the vehicle-body, and being divergently secured respectively to the axle and to the body above the axle, substantially as described.

6. In a vehicle of the class described, a low-down body, a rear axle, supporting-springs between said axle and body for carrying the load, and a draft-spring secured at its forward end to the vehicle-body and having divergent members secured respectively to the axle and the rear part of the vehicle-body over the axle, substantially as described.

7. In a vehicle of the class described, a low-down body, a rear axle, supporting-springs between said axle and body for carrying the load, and a draft-spring secured at its forward end to the vehicle-body and having divergent members secured respectively to the axle and the rear part of the vehicle-body over the axle, said members being extended to the rear of said axle and body in convergent lines and being connected together at their meeting ends, substantially as described.

8. In a vehicle of the class described, a low-down body, a rear axle, supporting-springs between said axle and body for carrying the load, and a draft-spring secured at its forward end to the vehicle-body and having divergent members secured respectively to the axle and the rear part of the vehicle-body over the axle, said members being extended to the rear of said axle and body in convergent lines and being connected at their meeting ends by a pivoted link, substantially as described.

9. A vehicle having a low-down body, provided with front running-gear, and an elliptical front supporting-spring, rear running-gear, and an elliptical rear supporting-spring, and side elliptical springs, connected at their forward convergent ends to the sides of the low-down body, and at their divergent portions connected to the rear axle and to the rear end of the body above the axle, substantially as described.

10. A vehicle having a low-down body, provided with front running-gear, and an elliptical front supporting-spring, rear running-gear, and side elliptical springs, connected together at their forward convergent ends to the sides of the low-down body, and at their divergent portions connected to the rear axle and to the rear end of the body above the axle, substantially as described.

11. The combination with a low-down body and the rear running-gear, of a draft device including divergent spring members and secured together at their forward ends to the low-down portion of the vehicle-body, said members extending divergently rearward and secured respectively to the axle and to the body above the axle, the point of securing said members to the said low-down portion being below the median horizontal line between the top and bottom points of union of said members to said axle and body, substantially as described.

In testimony whereof I have signed my name to this specification in the presence of two subscribing witnesses.

ALBERT A. HOLT.

Witnesses:
GEO. H. MAXWELL,
FREDERICK L. EMERY.